United States Patent
Huang et al.

(10) Patent No.: US 10,147,538 B2
(45) Date of Patent: Dec. 4, 2018

(54) COIL ARRANGEMENT

(71) Applicant: Nokia Corporation, Espoo (FI)

(72) Inventors: Wei Huang, San Diego, CA (US); Niels Bonne Larsen, Encinitas, CA (US); Marie Van Deusen, Poway, CA (US); Jorge Zabaco, San Diego, CA (US)

(73) Assignee: Nokia Technologies Oy, Espoo (FI)

( * ) Notice: Subject to any disclaimer, the term of this patent is extended or adjusted under 35 U.S.C. 154(b) by 756 days.

(21) Appl. No.: 14/534,288

(22) Filed: Nov. 6, 2014

(65) Prior Publication Data

US 2015/0130979 A1 May 14, 2015

Related U.S. Application Data

(60) Provisional application No. 61/901,786, filed on Nov. 8, 2013.

(51) Int. Cl.
*H04B 5/00* (2006.01)
*H02J 50/10* (2016.01)
*H01F 38/14* (2006.01)
*H02J 50/12* (2016.01)
*H04N 5/225* (2006.01)
(Continued)

(52) U.S. Cl.
CPC ............. *H01F 38/14* (2013.01); *H01F 41/00* (2013.01); *H02J 7/025* (2013.01); *H02J 50/10* (2016.02); *H02J 50/12* (2016.02); *H04B 5/0031* (2013.01); *H04B 5/0037* (2013.01);
(Continued)

(58) Field of Classification Search
CPC .. H01F 38/14; H01F 41/00; H01F 6/06; H02J 50/10; H02J 7/025; H04B 5/0031; H04B 5/0037; H04B 5/0081; H04N 5/2257; Y10T 29/49073; H01Q 1/245
See application file for complete search history.

(56) References Cited

U.S. PATENT DOCUMENTS 7,920,163 B1 * 4/2011 Kossin ................. H04N 5/2252
348/81
2001/0038280 A1 * 11/2001 Aizawa ................... H01F 38/14
323/355
(Continued)

FOREIGN PATENT DOCUMENTS

CN 102509865 A 6/2012
DE 10 2011 014 752 A1 9/2012
(Continued)

OTHER PUBLICATIONS

Suzuki, Naobumi, et al., "A study on antenna coils for wireless ID tags", 1997 Asia Pacific Microwave Conference, pp. 1077-1080.

*Primary Examiner* — Jared Fureman
*Assistant Examiner* — James Evans
(74) *Attorney, Agent, or Firm* — Harrington & Smith

(57) ABSTRACT

An apparatus including a first layer having a first coil; a second layer having a second coil, where the first and second coils are stacked relative to each other and configured to be located at an aperture of a housing member including electrically conductive material; and a third layer located under the second layer. The third layer includes a ferrite member located under the second coil such that the second coil is between the first coil and the ferrite member. The first coil or the second coil has a substantially "8" shape.

15 Claims, 13 Drawing Sheets

(51) Int. Cl.
   *H01F 41/00*   (2006.01)
   *H02J 7/02*   (2016.01)

(52) U.S. Cl.
   CPC ......... *H04B 5/0081* (2013.01); *H04N 5/2257* (2013.01); *Y10T 29/49073* (2015.01)

(56) References Cited

U.S. PATENT DOCUMENTS

| | | | |
|---|---|---|---|
| 2008/0252551 A1 | 10/2008 | Kubo et al. | 343/867 |
| 2010/0201315 A1* | 8/2010 | Oshimi | H01M 10/46 320/108 |
| 2011/0043050 A1* | 2/2011 | Yabe | H01F 27/2804 307/104 |
| 2011/0227799 A1 | 9/2011 | Hashimoto | 343/702 |
| 2012/0248883 A1 | 10/2012 | Konanur et al. | |
| 2012/0262357 A1* | 10/2012 | Kato | H01Q 1/38 343/788 |
| 2012/0293668 A1* | 11/2012 | Huang | H04N 5/2257 348/207.1 |
| 2013/0234905 A1 | 9/2013 | Kato et al. | 343/788 |
| 2013/0293026 A1* | 11/2013 | Miyamoto | H02J 50/12 307/104 |
| 2014/0159502 A1* | 6/2014 | Shimokawa | H02J 17/00 307/104 |
| 2014/0168019 A1* | 6/2014 | Hirobe | H01Q 5/40 343/720 |
| 2015/0004904 A1* | 1/2015 | Lisi | H04B 5/0031 455/41.1 |

FOREIGN PATENT DOCUMENTS

| | | |
|---|---|---|
| EP | 2 648 274 A1 | 10/2013 |
| JP | H-03265305 A | 11/1991 |
| JP | 2004126750 A | 4/2004 |
| JP | 2005269537 A | 9/2005 |
| JP | 2008288889 A | 11/2008 |
| JP | 200900504 A | 9/2009 |
| JP | 2009267077 A | 11/2009 |
| JP | 4531848 B1 | 8/2010 |
| JP | 2012199370 A | 10/2012 |
| JP | 2013138045 A | 7/2013 |
| JP | 2013192390 A | 9/2013 |
| JP | 2013192391 A | 9/2013 |
| JP | 2013219791 A | 10/2013 |
| JP | 2014518057 A | 7/2014 |
| WO | WO-2013 065245 A1 | 5/2013 |
| WO | WO-2013 105565 A1 | 7/2013 |
| WO | WO-2013 115147 A1 | 8/2013 |
| WO | WO-2013 115158 A1 | 8/2013 |

* cited by examiner

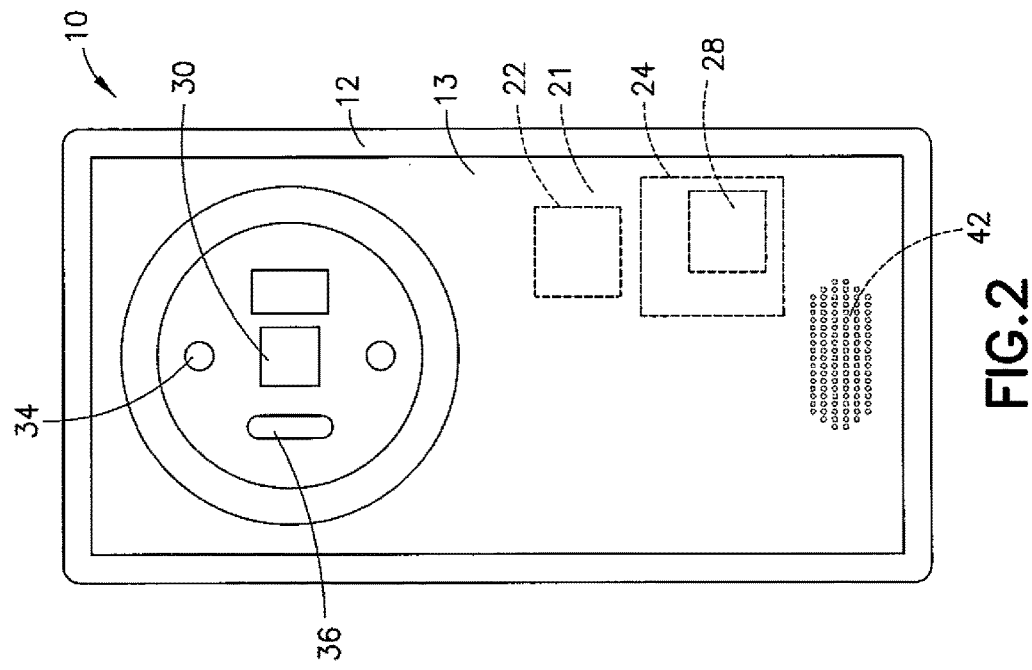
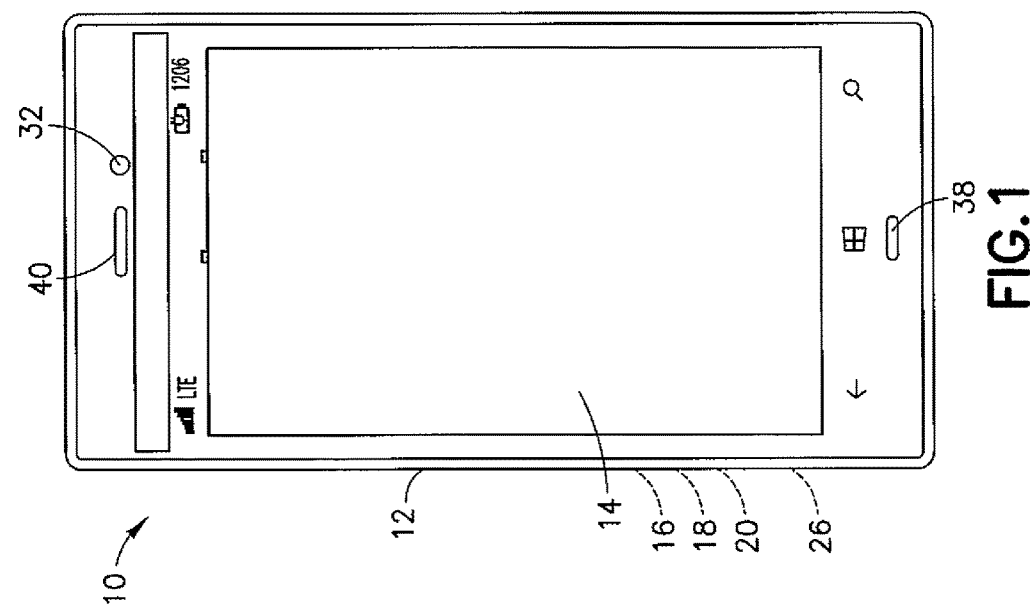

COIL ARRANGEMENT

CROSS REFERENCE TO RELATED APPLICATION

This application claims priority under 35 USC 119(e) on U.S. provisional patent application No. 61/901,786 filed Nov. 8, 2013, which is hereby incorporated by reference in its entirety.

BACKGROUND

Technical Field

The exemplary and non-limiting embodiments relate generally to an arrangement of coils in an apparatus and, more particularly, to an apparatus having a housing member comprising electrically conductive material.

Brief Description of Prior Developments

Portable electronic devices, such as a mobile phone for example, are known which have a metal housing. Short range communications systems, such as Near Field Communication (NFC) and Radio Frequency IDentification (RFID) are known which use a near field communication coil, which operates in the near field. Charging of a rechargeable battery is known which uses an induction coil.

SUMMARY

The following summary is merely intended to be exemplary. The summary is not intended to limit the scope of the claims.

In accordance with one aspect, an example embodiment is provided in an apparatus is provided comprising a first layer having a first coil, where the first coil has a substantially "8" shape; a second layer having a second coil, where the first and second coils are stacked relative to each other and configured to be located at an aperture of a housing member comprising electrically conductive material; and a third layer located under the second layer, where the third layer comprises a ferrite member located under the second coil such that the second coil In accordance with another example embodiment, an apparatus is provided comprising a first layer having a first coil; a second layer having a second coil, where the first and second coils are stacked relative to each other and configured to be located at an aperture of a metal housing member; and a third layer located under the second layer, where the third layer comprises a ferrite member located under the second coil such that the second coil is between the first coil and the ferrite member, where the first coil or the second coil has a substantially "8" shape.

An example embodiment of a method may comprise locating a first coil above a second coil; and locating a ferrite member below the second coil, where the coils and the ferrite member are assembled into a stack, where the first coil or the second coil has a substantially "8" shape.

BRIEF DESCRIPTION OF THE DRAWINGS

The foregoing aspects and other features are explained in the following description, taken in connection with the accompanying drawings, wherein:

FIG. 1 is a front view of an example embodiment of an apparatus comprising features as described herein;

FIG. 2 is a rear view of the apparatus shown in FIG. 1;

DETAILED DESCRIPTION OF EMBODIMENTS

Figure 3:
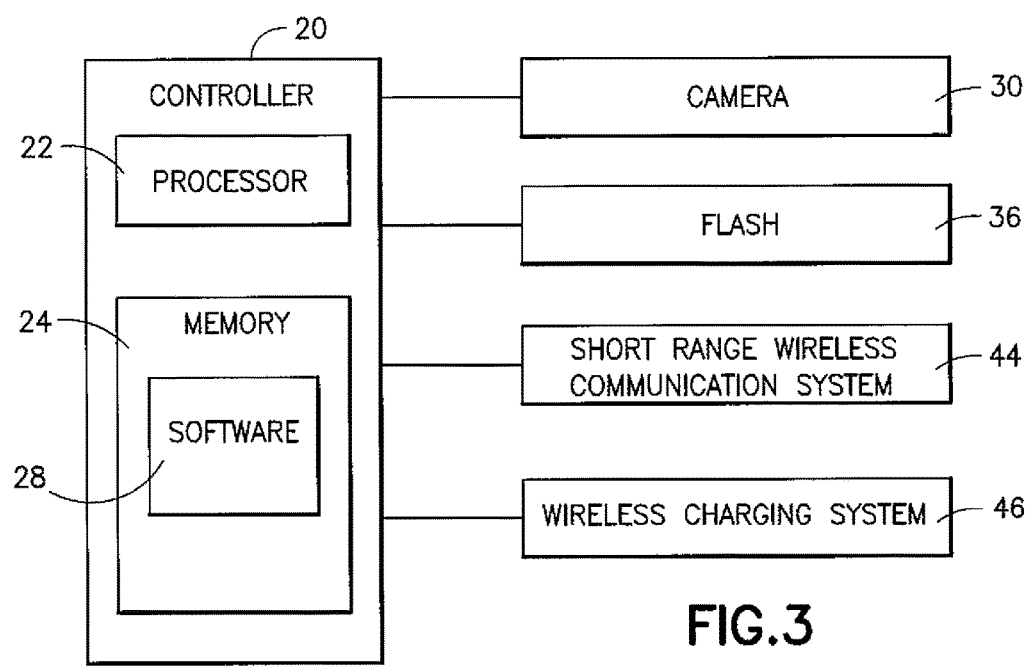
FIG. 3 is a diagram illustrating some components of the apparatus shown in FIGS. 1-2.

Referring to FIG. 1, there is shown a front view of an apparatus 10 incorporating features of an example embodiment. Although the features will be described with reference to the example embodiments shown in the drawings, it should be understood that features can be embodied in many alternate forms of embodiments. In addition, any suitable size, shape or type of elements or materials could be used.

The apparatus 10 may be a hand-held portable apparatus, such as a communications device which includes a telephone application for example. In the example shown the apparatus 10 is a smartphone which includes a camera and a camera application. The apparatus 10 may additionally or alternatively comprise an Internet browser application, a video recorder application, a music player and recorder application, an email application, a navigation application, a gaming application, and/or any other suitable electronic device application. In an alternate example embodiment the apparatus might not be a smartphone, and may alternatively be and not limited to, for example, a mobile phone, a media device capable of playing and/or recording audio and/or video, a portable computer, a tablet computer, a laptop, a mobile sports device, a mobile medical device, a mobile navigation device and/or a mobile communication device.

Referring also to FIGS. 2-3, the apparatus 10, in this example embodiment, comprises a housing 12, a touchscreen 14, a receiver 16, a transmitter 18, a controller 20, a rechargeable battery 26 and a camera 30. However, all of these features are not necessary to implement the features described below. The controller 20 may include at least one processor 22, at least one memory 24, and software 28. The electronic circuitry inside the housing 12 may comprise at least one printed wiring board (PWB) 21 having components such as the controller 20 thereon. The receiver 16 and transmitter 18 form a primary communications system to allow the apparatus 10 to communicate with a wireless telephone system, such as a mobile telephone base station for example.

In this example, the apparatus 10 includes the camera 30 which is located at the rear side 13 of the apparatus, a front camera 32, an LED 34, and a flash system 36. The LED 34 and the flash system 36 are visible at the rear side of the apparatus, and are provided for the camera 30. The cameras 30, 32, the LED 34 and the flash system 36 are connected to the controller 20 such that the controller 20 may control their operation. In an alternate example embodiment the rear side may comprise more than one camera, and/or more than one flash/LED, and/or the front side could comprise more than one camera, or the front and/or rear side may comprise only one of the camera 32, LED 34 or flash system 36. The apparatus 10 includes a sound transducer provided as a microphone 38. In an alternate example the apparatus may comprise more than one microphone. The apparatus 10 includes a sound transducer provided as an earpiece 40, and a sound transducer provided as a speaker 42. More or less than one speaker may be provided.

Figure 4:
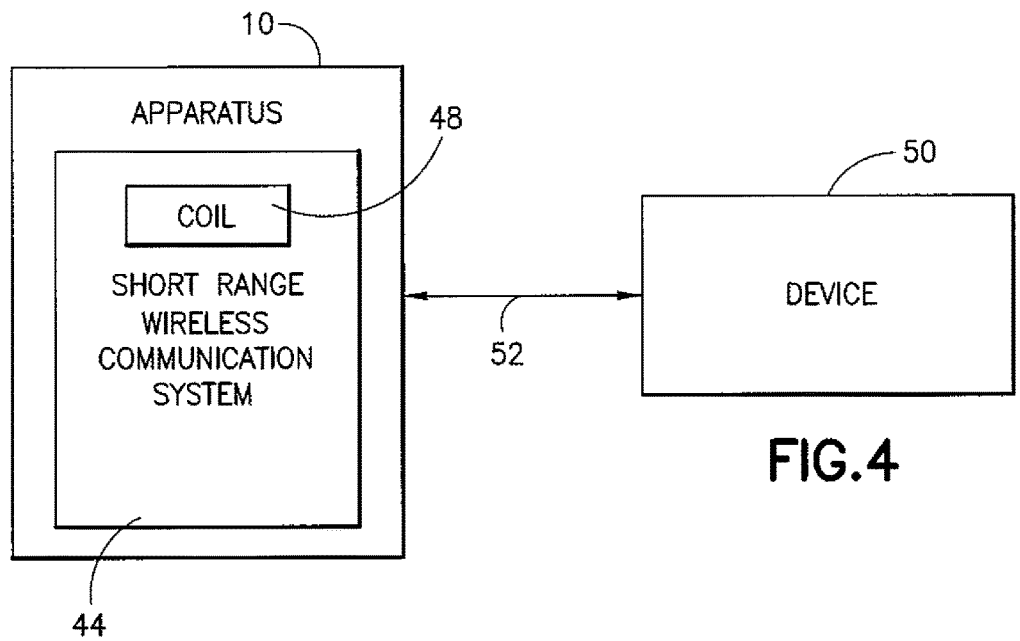
FIG. 4 is a diagram illustrating the apparatus shown in FIGS. 1-2 in communication with another device with use of the short range wireless communication system.

As illustrated in FIG. 3, in this example embodiment the apparatus 10 also includes a short range wireless communication system 44 and a wireless charging (WLC) system 46. The short range wireless communication system 44 may be, for example, a Near Field Communication (NFC) system or a Radio-frequency identification (RFID) communication system. Referring also to FIG. 4, the short range wireless communication system 44 includes a coil 48. The coil 48 is adapted to transmit and receive information to another device 50 as illustrated by the wireless link 52. The coil 48 is a communication coil adapted to transmit and/or receive information in the "near field", as opposed to the "far field", but nevertheless is capable of electromagnetic wireless communication.

Figure 5:
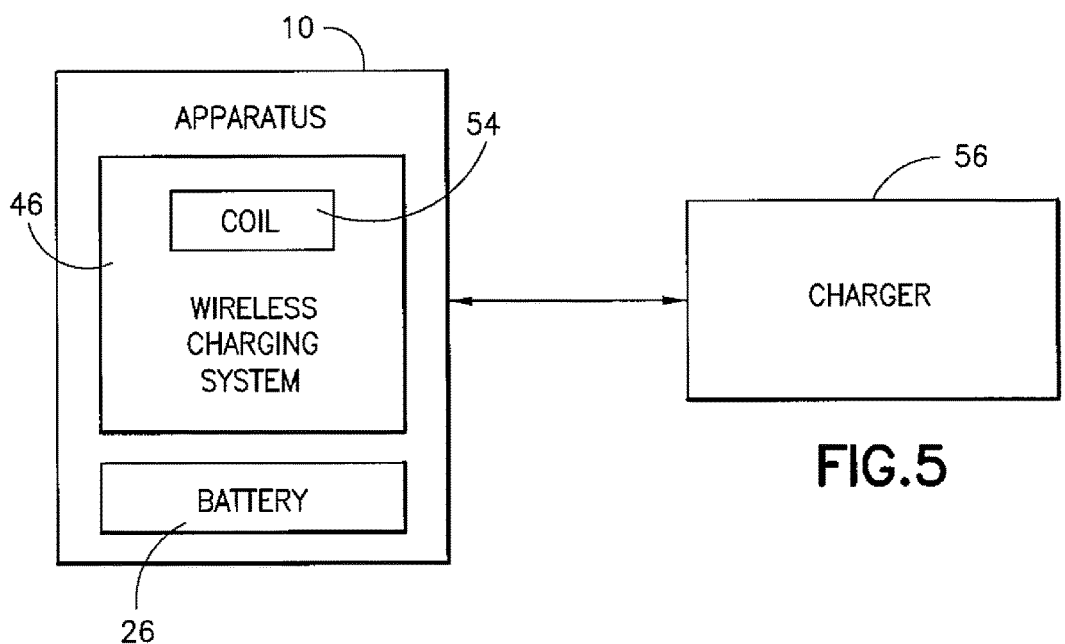
FIG. 5 is a diagram illustrating the apparatus shown in FIGS. 1-2 having its battery recharged with use of a wireless charging system having an second coil.

Referring also to FIG. 5, the wireless charging system 46 may be an induction charging system for charging the battery 26. The wireless charging system 46 includes a wireless charging coil 54. This coil 54 is used as an induction coil to cooperate with a coil in the charger 56 to induce a current in the coil 54. This current can be used to recharge the battery 26. Because there is a small gap between the two coils employed in each of the sender and receiver of the energy within the respective devices, inductive charging is considered a short-distance "wireless" energy transfer, because it frees the user from having to deal with wires between the two devices.

The two coils 48, 54 are both basically used as "induction coils"; one is used for communication purposes (RFID or NFC or some other protocol which may be created in the future) and the other is used for wireless charging. However, both coils are basically inductors, i.e. poor radiators and hence only radiate in the "near field" and not in the "far field".

Figure 6:
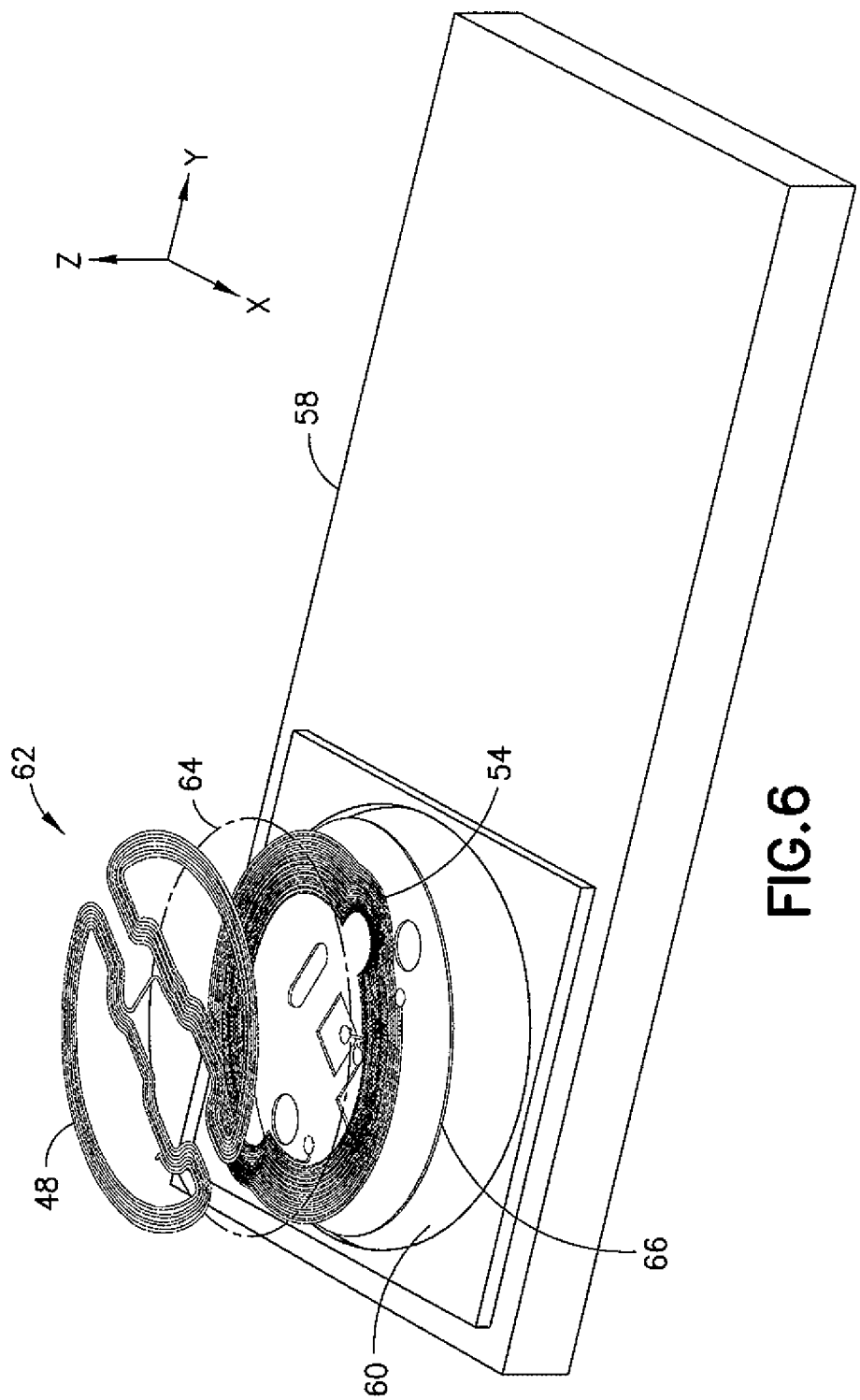
FIG. 6 is an exploded view of some of the components of the apparatus shown in FIG. 2.

Referring also to FIG. 6, portions of the apparatus 10 are shown in an exploded view. In this example embodiment the housing 12 includes a rear side member 58 which is made of metal. However, features as described herein may be used with housing members made of material(s) other than metal, such as a plastic housing member which is coated with a layer of conductive material for example. In this example an aperture 60 is provided in the rear side member 58. The example embodiment comprises a module 62 which is located in the aperture 60.

Figure 7:
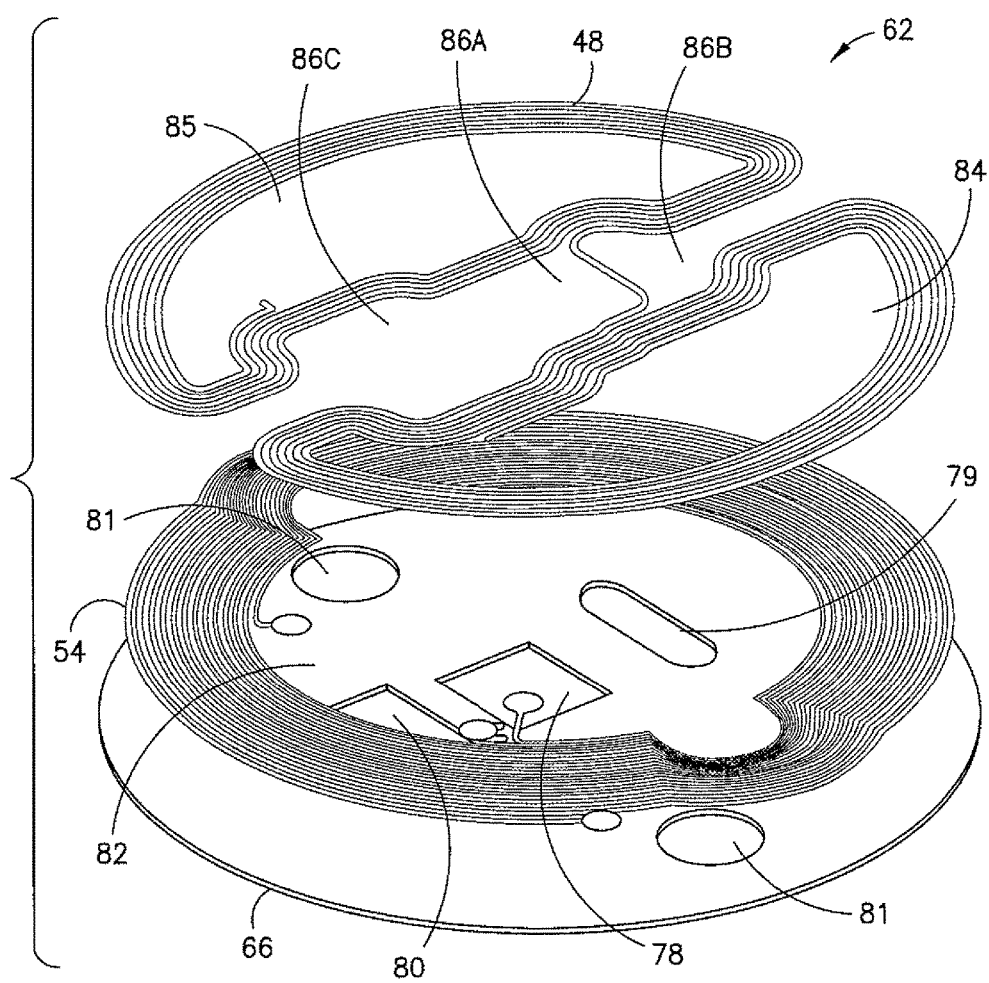
FIG. 7 is an enlarged exploded view of some of the components shown in FIG. 6.

Referring also to FIG. 7, an enlarged view of the module 62 is shown. The module 62 generally comprises a printed wiring board (PWB) 64 (not shown in FIG. 7 merely for the sake of clarity and shown in phantom in FIG. 6 merely for the sake of clarity), the first coil 48, the second coil 54 and a ferrite member 66. In an alternate example embodiment one or more of these members might not be provided as a module. In the example embodiment shown the members 66, 54, 64, 48 are stacked in the order shown. The PWB 64 provides at least part of the electrical connection of the controller 20 to the two coils 48, 54.

Figure 8:
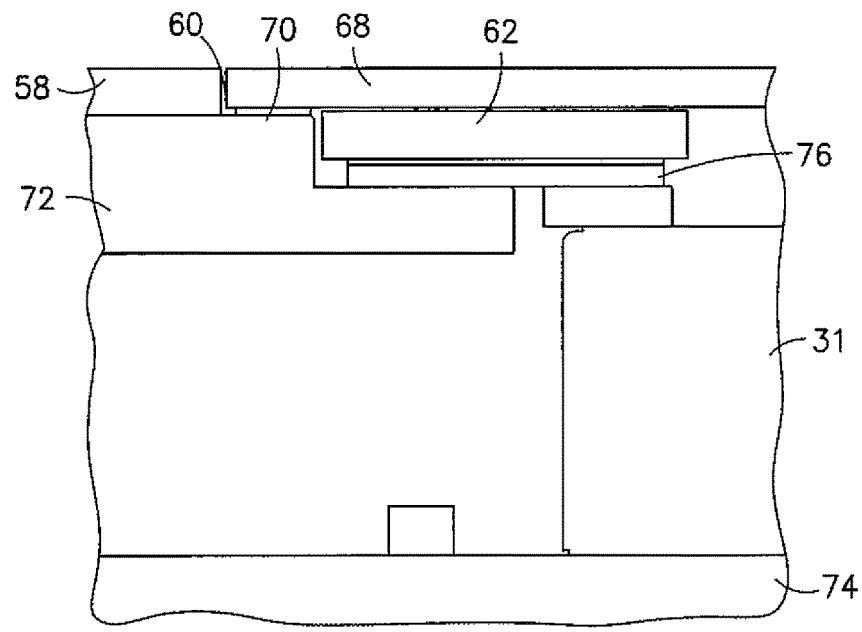
FIG. 8 is a partial cross sectional view of the apparatus shown in FIG. 2.

Referring also to FIG. 8, the module 62 is located over a module 31 forming the camera 30. In an alternate example embodiment the module 31 may be any suitable type of multi-media component; in addition to or rather than a camera. A glass cover 68 is provided over the module 62. The glass cover 68 is connected to the housing member 58 by a frame member 72 and adhesive 70 for example. The module 31 is mounted on a printed wiring board 74, and connected to the frame member 72. This positively locates the camera module 31 in the vicinity of the aperture 60 through the housing member 58. A gasket and/or adhesive 76 mounts the module 62 to the frame member 72 to also positively locate the module 62 in the vicinity of the aperture 60 and above the camera module 31. In one type of alternate example embodiment, the coil 48 may be bonded, such as with adhesive, to the inside surface of the glass cover 68. As further understood from one of the different example embodiments described below, the module 62 might not be located over the module 31. The module 62 may be spaced away from the component 31.

In this example embodiment the module 62 is located over the camera module 31. However, as noted above, in alternate example embodiments the module 62 might not be located over the camera module 31. As another example embodiment the apparatus might not comprise a camera or camera module. In the example shown, because the coil module 62 is located over the camera, accommodations are made to allow features to pass though the module 62, such as an image to the camera 30, a flash from the flash system 36, a flash from an LED for red eye reduction, an autofocus or rangefinder beam, etc. In this particular example the ferrite 66 and PWB 64 comprise apertures 78, 79, 80, 81 for these features and, the two coils 48, 54 have specific shapes forming apertures for light to pass through the members 66, 54, 64, 48 without being blocked. Although five apertures 78-81 are shown in this example, more or less than five apertures may be provided. The apertures are generally provided for multi-media components such as one or more flashes, one or more cameras, internal hands free speaker(s) (IHF(s)), etc. The locations of the apertures are not limited to the example embodiment shown. One or more of the holes may also provide a pass-through for sound and not merely light.

As seen best in FIG. 7, the second coil 54 has a general ring shape and is located above the ferrite 66. The coil is shaped with inward side notches to cooperate with the holes 81 for light to pass-through. In an alternate example embodiment the side notches might not be provided. The relatively large center aperture 82 of the coil 54 provides a large open area for light to travel through the aperture 82 to and from the various optical components such as camera 30 and flash system 36 for example. In an alternate embodiment audio components, for example and not limited to one or more speaker, IHF, microphone, could replace or complement the imaging related components (camera, flash, LED, etc). For example, the aperture 82 may provide enough space for sound to travel through the coil 54. The printed wiring board 64 is sandwiched between the two coils 48, 54. The first coil 48 is mounted on top of the PWB 64 and has a general figure "8" shape in this example embodiment. The shape of the coil 48 provides apertures 84, 85 to cooperate with the holes 81 for a pass-through. The shape of the coil 48 also provides a center area aperture with three portions 86A, 86B, 86C to cooperate with the holes 78, 79, 80 for respective pass-throughs.

Figure 9:
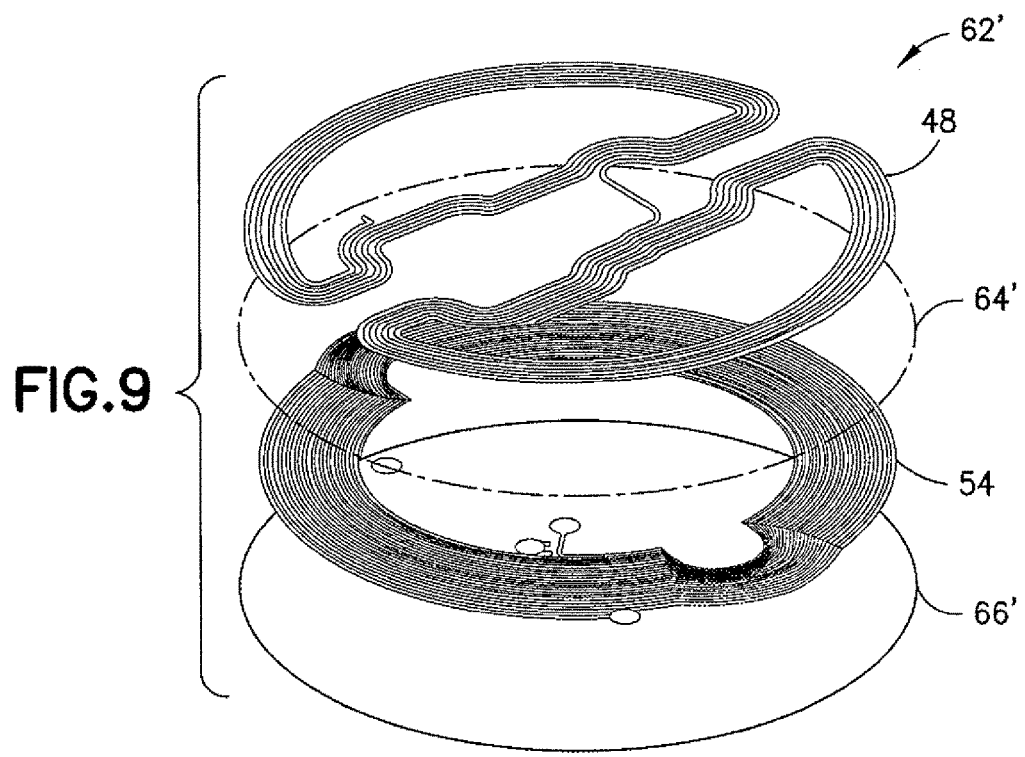
FIG. 9 is an exploded view similar to FIG. 7 of an alternate example embodiment.
Figure 10:
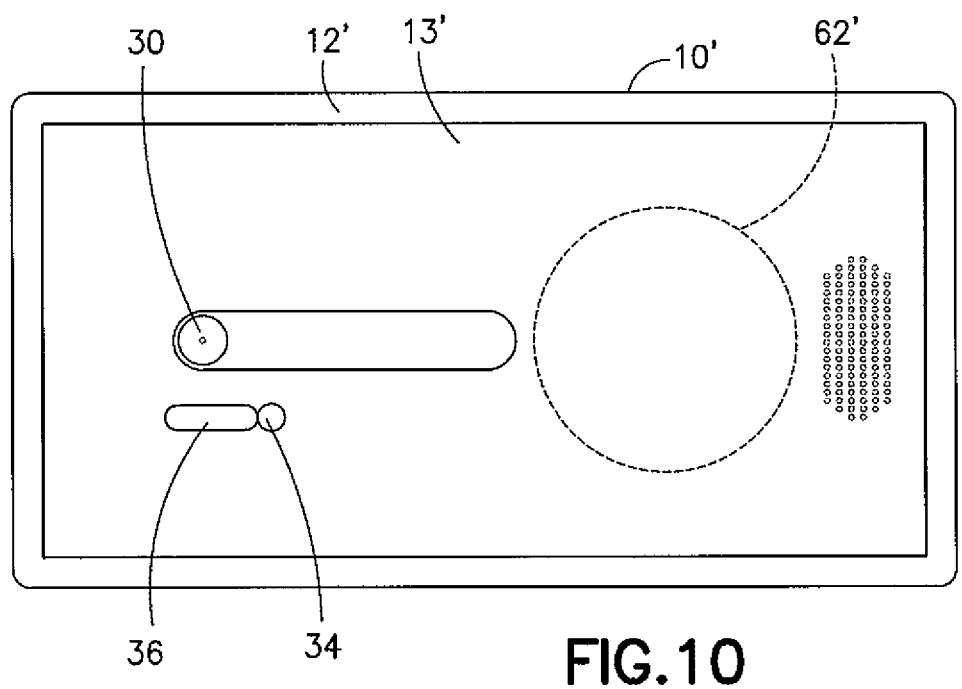
FIG. 10 is a rear side view similar to FIG. 2 of an alternate example embodiment.

As noted above, features as described here do not need to be used at the camera. Referring also to FIGS. 9-10 for example, the module 62' may be used in an apparatus 10' spaced from the camera 30 and flash system 36. In this example, the ferrite 66' and the PWB 64' do not have apertures such as the apertures 78-81 because they are not needed. The module 62' may be provided such as if the back cover 13' of the housing 12' is comprised of metal for example, as further understood from the description below.

Figure 11:
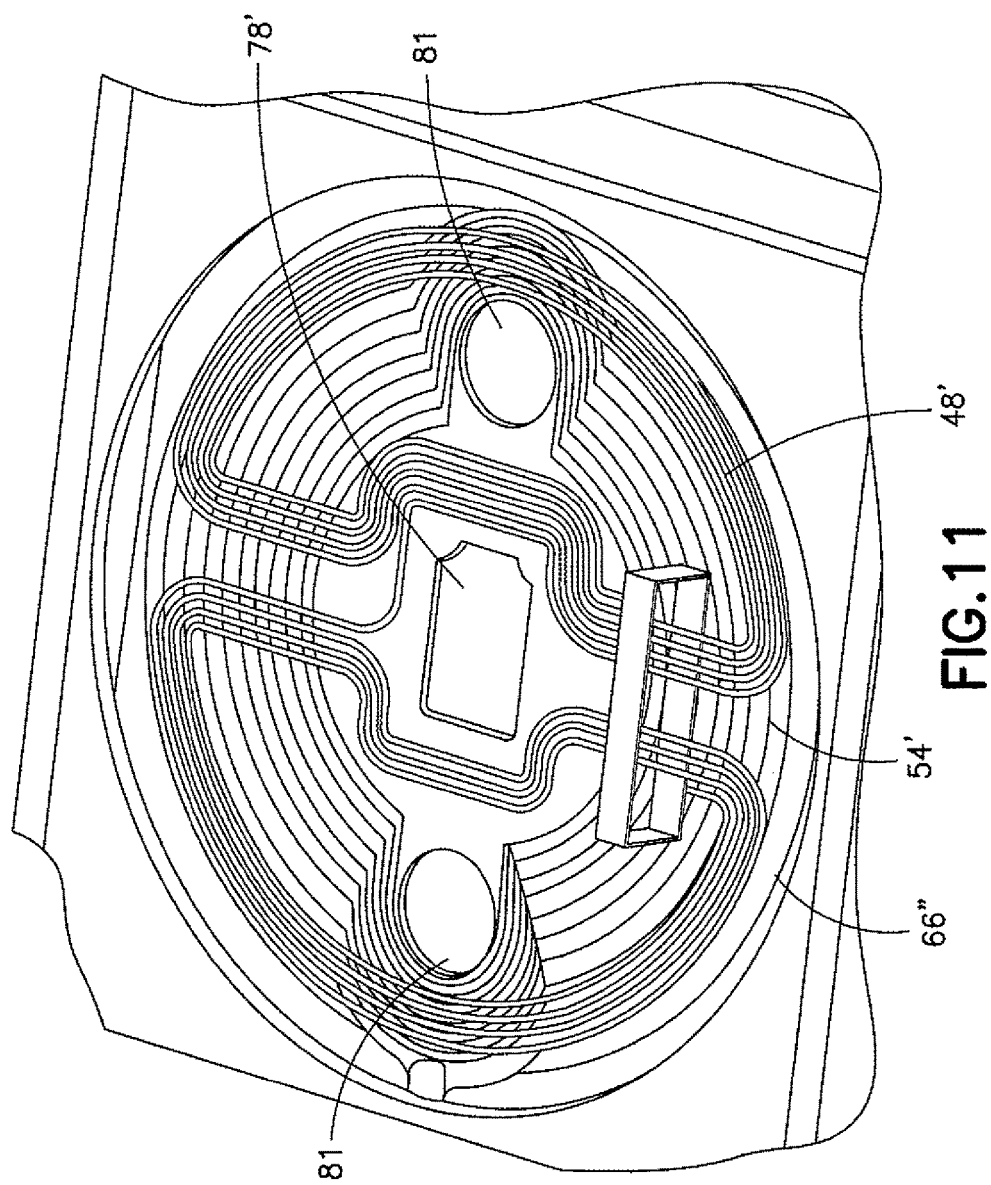
FIG. 11 is a partial perspective view of an alternate example embodiment.

Referring also to FIG. 11, another alternate example embodiment is shown for use above a camera. The components include a first coil 48', a second coil 54', 81 and a ferrite 66". The ferrite 66' includes holes 78', and the coils 48', 54' are shaped to provide unobstructed paths through the components for images to be captured by the camera and for light to pass through the components. The first coil 48' has a general figure "8" shape. The first coil 48' is located over the second coil 54'. The ferrite 66' is located under the second coil 54'. A PWB (not shown) may be provided between the coils 54', 48' similar to the embodiment described above.

Features as described herein may be used with a near field communication coil and/or electromagnetic coupling arrangements for portable electronic devices. Providing such an antenna arrangement in a mobile device having a conductive cover or housing, and which meets all the required antenna performance criteria, is challenging. Features as described herein may use a dual coil arrangement in which a first coil operates in the RFID or NFC near field system (such as 13.56 MHz for example) and in which a second coil operates in the WLC (Wireless Charging) protocol (e.g. Qi—an interface standard developed by the Wireless Power Consortium for inductive electrical power transfer over distances of up to 4 cm (1.6 inches)). The two coils maybe stacked one on top of the other in the Z-axis and share a same ferro-magnetic member. The first coil may be wound in a figure "8" shape. The first coil may be the furthest from the ferro-magnetic member and closest to the outer surface of the conductive housing of the mobile device. The mobile device housing may have an aperture formed in a rear surface of the housing in which the stack of coils and ferro-magnetic member are housed. A camera lens and/or flash may also be included within the inner periphery of the coils.

Features as described herein may provide a dual near field coil solution which works within an aperture formed in a conductive housing of a mobile device. Only one ferrite/magnetic member is required. The stack may also surround a camera lens and/or flash. Strong eddy currents are not generated due to the "8" figure shape of the communication coil, which improves communication distance or performance. There is also little interference between the coils. Thus, they can co-exist with one another in a tight volume.

A coil arrangement may be provided comprising a first coil wound in a figure "8" and configured to resonate in a first frequency band (for NFC for example), a second coil configured to resonate in a second frequency band (for WLC for example), different to the first frequency band, where at least one of the first and second coils is located at least partially above the other coil, and where the coils are configured to be located within an aperture formed in a housing of a mobile device, where the housing comprises electrically conductive material, wherein the coils are located above a ferrite member such that the second coil is located between the first coil and the ferrite member.

Figure 12:
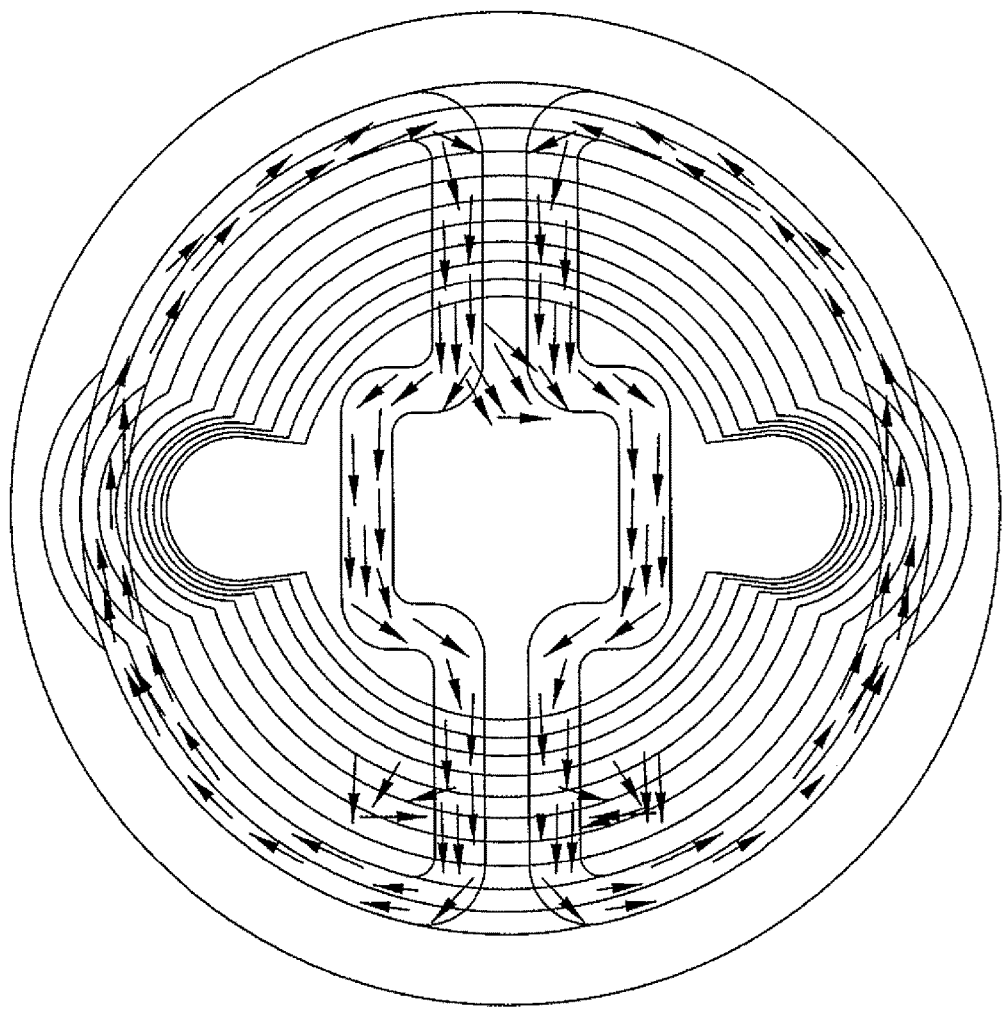
FIG. 12 is a diagram illustrating surface currents on the first coil shown in FIG. 11.

Referring also to FIG. 12, a diagram is shown illustrating surface currents on the first coil 48'. A majority of surface currents on the metal cover is out-of-phase compared with the surface currents on the first coil. The magnetic field generated from surface currents on the metal cover does not disturb with the magnetic field generated by the first coil.

Without this type of construction, a majority of the surface currents on metal cover would be in the opposite direction of surface currents on first coil. The magnetic field generated by the eddy currents on metal cover would deteriorate the magnetic field strength generate by the first coil. Thus, neither the NFC nor the WLC would work when it is completely under the metal cover. This is because a majority of the surface currents on the WLC coil and the metal cover would be in the opposite direction of surface currents on NFC, and would be canceled by each other. Poor coupling (such as −38 dB for example) would be observed between the NFC coil and the NFC FORUM POLLER0 coil. Poor charging efficiency would be observed for WLC.

Features as described herein provide a realistic solution for both NFC and WLC, such as at the camera aperture area on a mobile device's metal cover for example. Features as described herein may provide an 8-shape first coil, and a second coil sharing with one single ferrite stacked-up in the Z direction, such as integrated into the circular aperture of a metal plate for example.

Figure 13:
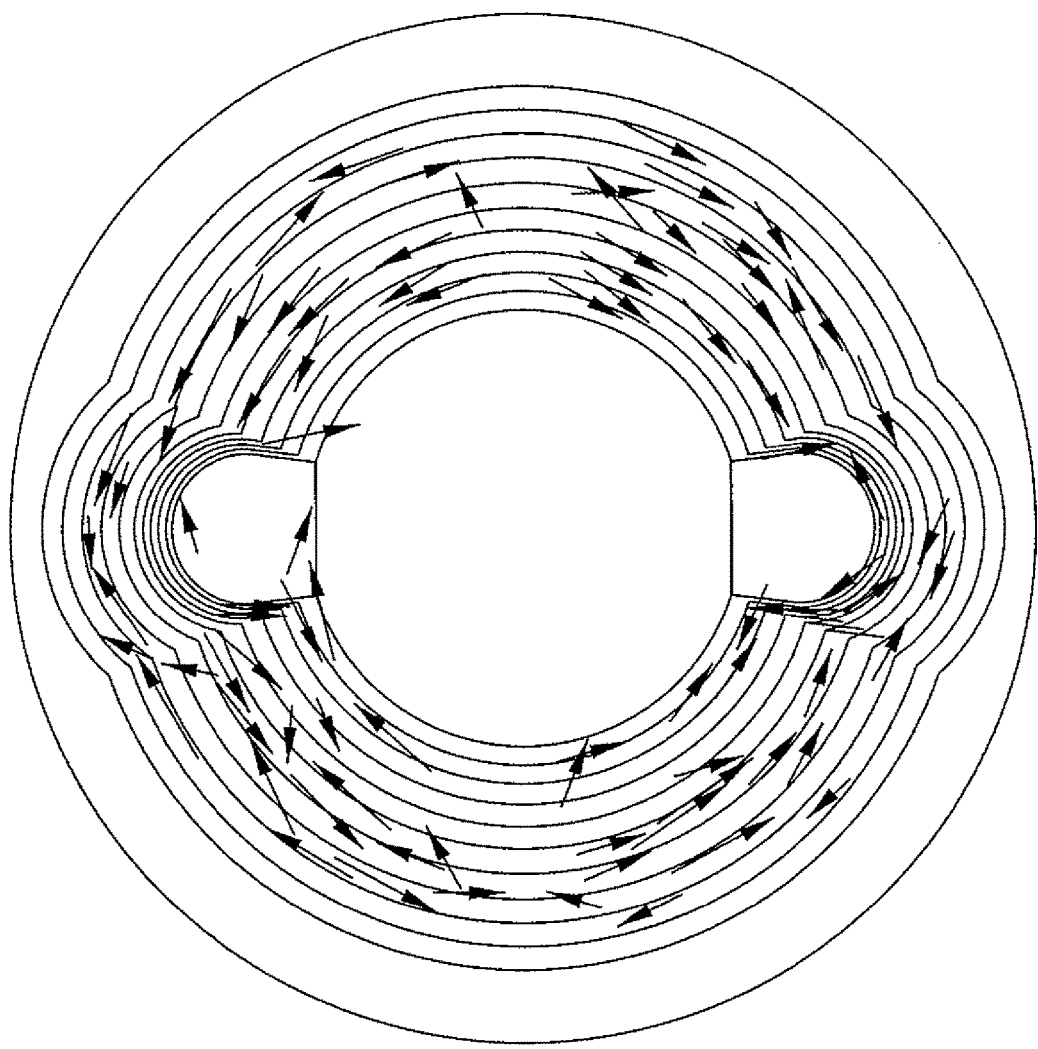
FIG. 13 is a diagram illustrating surface currents on the second coil shown in FIG. 11.
Figure 14:
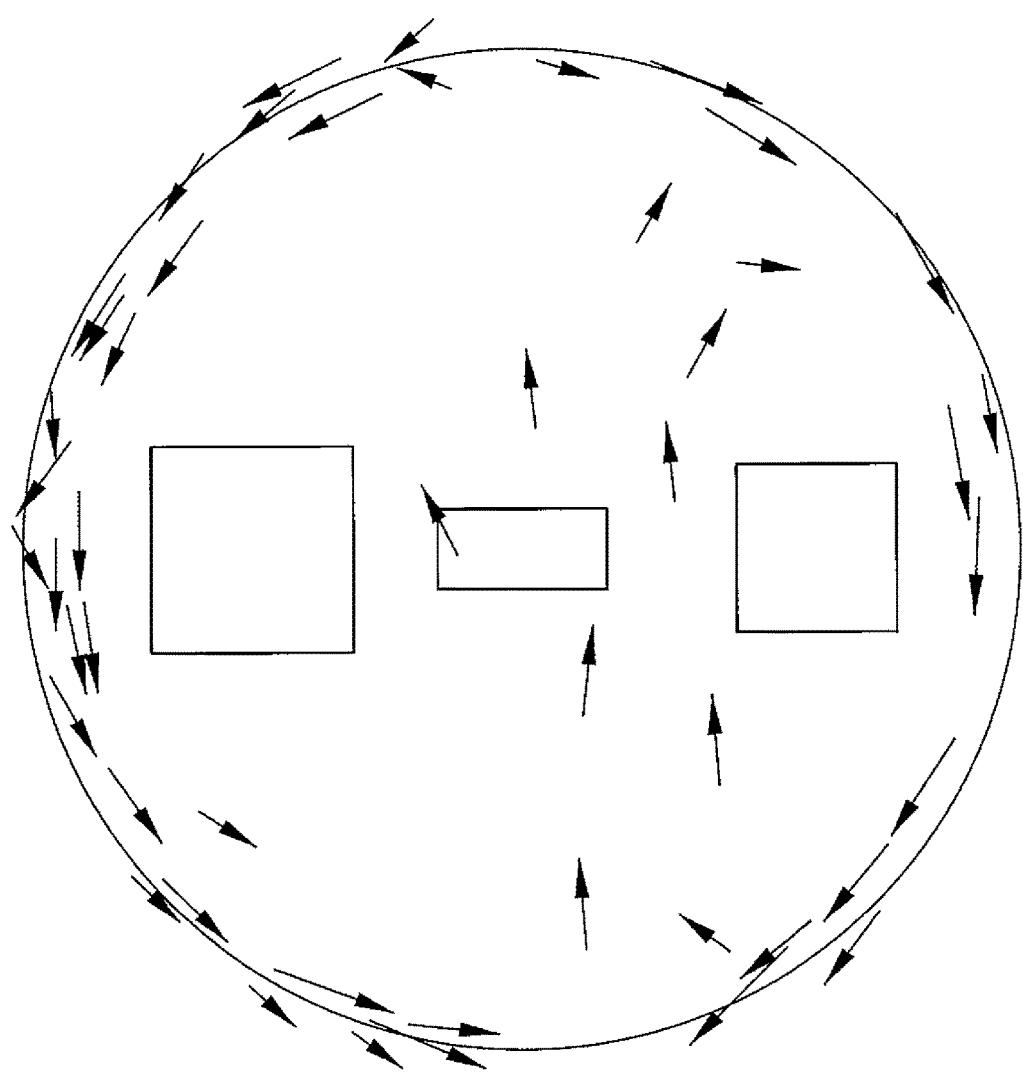
FIG. 14 a diagram illustrating surface currents on the metal cover shown in FIG. 2 with the components shown in FIG. 11.

A majority of surface currents on the WLC (as illustrated by FIG. 13) and the metal cover (as illustrated by FIG. 14) may be out-of-phase compared with the surface current on the NFC (as illustrated by FIG. 12). Therefore, the field generated from the WLC and metal does not disturb with the magnetic field generated by the NFC coil. Good coupling (such as about −16 dB for example) between the NFC coil and the NFC FORUM POLLER0 may be observed. Good charging efficiency may be observed for the WLC.

Figure 15:
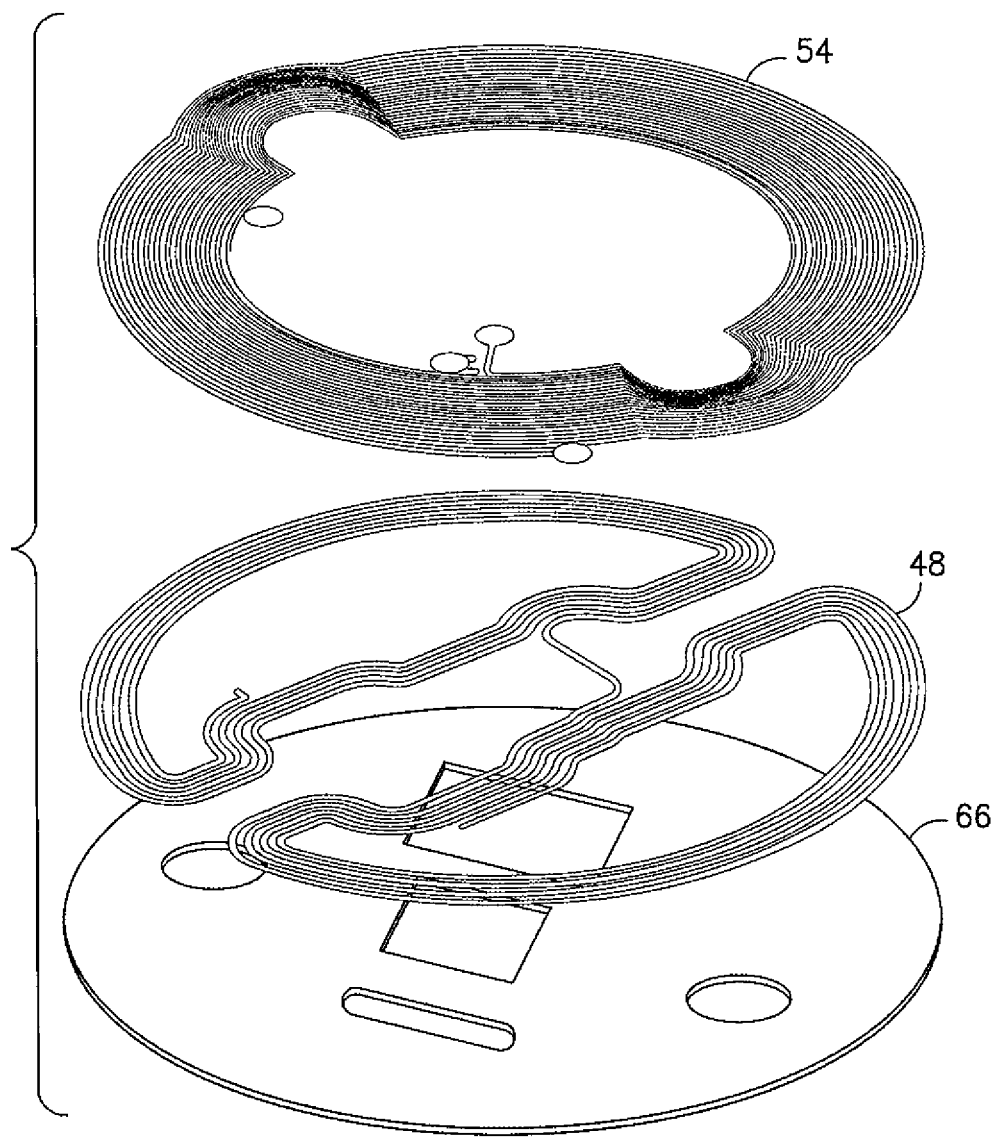
FIG. 15 is an exploded perspective view similar to FIG. 7 of an alternative example embodiment.

Not all the stack-up order of the components would work well. With the first coil 48 on the top, the second coil 54 in the middle and ferrite 66 at the bottom, both NFC and WLC have acceptable performance. FIG. 15 shows an alternative arrangement where the first coil 48 is located between the ferrite 66 and the second coil 54. The WLC performance would be good, but the short range communications with the first coil 48 would not be as good as the arrangement shown in FIG. 7. Any other stacking arrangement may produce either poor short range communications problems with the first coil 48 or poor induction charging with the second coil 54.

Figure 16:
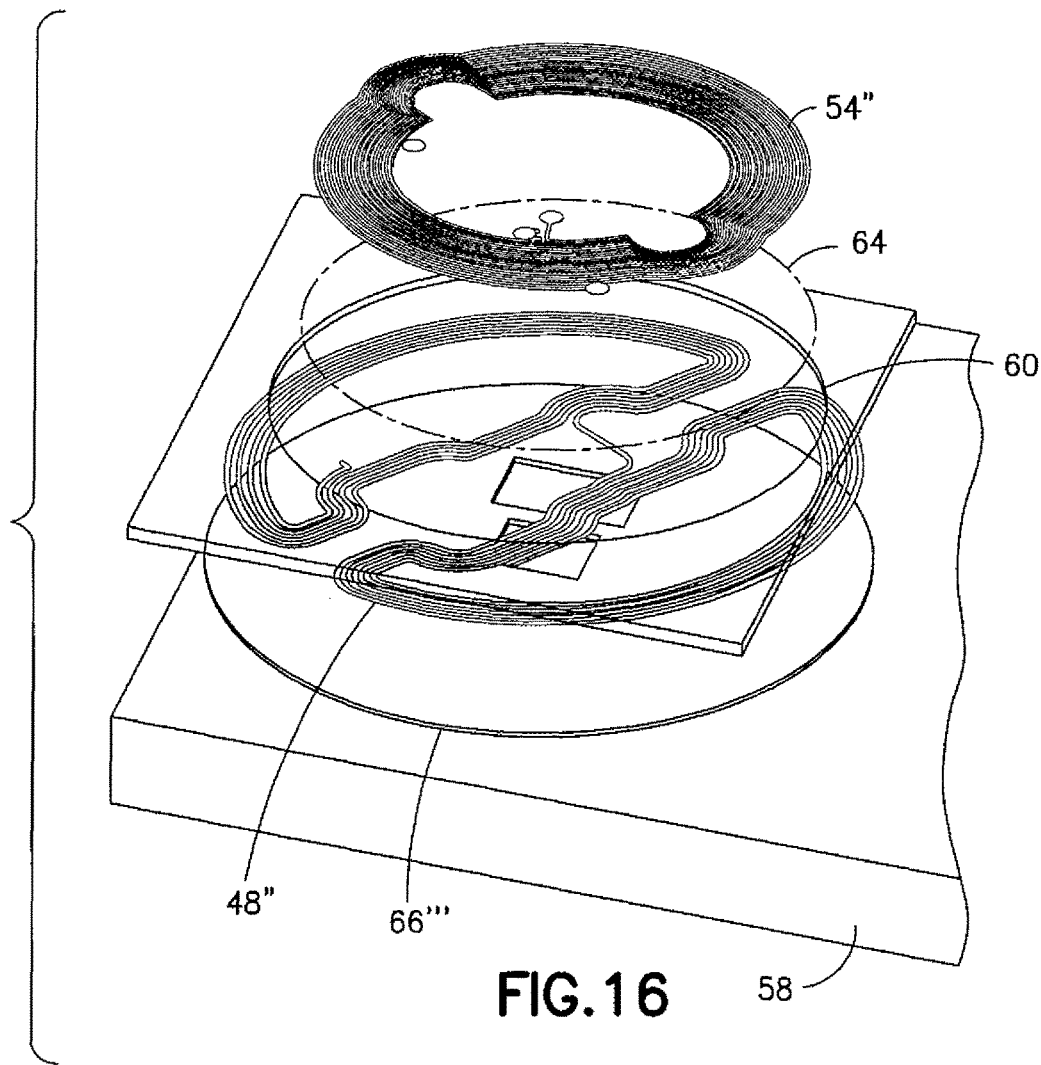
FIG. 16 is an exploded perspective view similar to FIG. 6 of an alternative example embodiment.

FIG. 16 shows an alternative arrangement where the first coil 48" is located between the ferrite 66''' and the second coil 54". However, in this example the second coil 54" is smaller than the first coil 48" in diameter. In addition the ferrite 66''' and the first coil 48" are larger than the aperture 60 in the housing member 58. Thus, the first coil 48" and the ferrite 66''' may be located at least partially under the metal housing member 58.

With use of current and independent flex technologies for the WLC and NFC, the stackup of components in the assembly may be ten parts from the gasket to the glass. The tolerances for placing these layers and sub-layers would require a lot of additional space in X and Y directions. Additionally, maintaining a planar surface of the assemblies below the glass may have a significant issue since the materials being used (flexes, adhesives, gaskets) will not be flat. This leaves a possibility that the glass after placement will not be flat causing reliability and/or visual quality issues. With features as described herein, a combination PWB 64 for both the second coil 54 and the short range communication coil 48 may be provided such that the stackup of components in the assembly is now only 6 parts from the gasket to the glass. This is because the NFC flex, adhesive, spacer, adhesive, WLC flex have now all been combined into one part.

The figure "8" arrangement of the communication coil may be used to make it work in a metal cover. There is only one ferrite/magnetic body 66 required rather than two different magnetic bodies. An example embodiment may be provided in an antenna arrangement comprising a figure "8" coil for short range communication, a normal coil for induction charging where the coils are stacked in the Z-direction within an aperture of a metal housing member, and stacked above a ferrite member such that the second coil is between the short range communication coil and the ferrite member, and where the aperture is formed in a conductive housing of a mobile device. The aperture may be configured to accept an electronic component (e.g. a camera) which is co-located with the antenna arrangement.

An example embodiment may be provided in an apparatus comprising a first layer having a first coil, where the first coil has a substantially "8" shape; a second layer having a second coil, where the first and second coils are stacked relative to each other and configured to be located within an aperture of a metal housing member; and a third layer located under the second layer, where the third layer comprises a ferrite member located under the second coil such that the second coil is between the first coil and the ferrite member. The first coil is a communication coil and the second coil is a charging coil. The ferrite member may be a sole ferrite member in the layers. The apparatus may further comprise a fourth layer located between the first and second layers, where the fourth layer comprises a printed wiring board. The ferrite member may comprise at least one aperture therein and the first and second coils may be shaped to allow light to pass through the first, second and third layers. The printed wiring board may comprise at least one aperture therein to allow light to pass through the printed wiring board. The ferrite member may comprise at least one aperture therein and the first and second coils are shaped to allow light and/or sound to pass through the first, second and third layers. The first, second and third layers may be sized and shaped to fit in an aperture in the metal housing member. The apparatus may further comprise a camera; a controller having the camera, the first coil and the second coil connected thereto, where the controller comprises a printed wiring board with a processor and at least one memory with software; an electronic display connected to the controller; a receiver connected to the controller; a transmitter connected to the controller; and a rechargeable battery connected to the controller. The apparatus may further comprise means for providing induction charging and short range wireless communication through a metal housing of the apparatus. At least two of the layers may be stationarily connected to one another as a module, where the module is configured to be connected to the housing member as a unitary assembly. The apparatus may be a portable electronic device having the housing member.

An example embodiment may be provided in an apparatus comprising a first layer having a first coil; a second layer having a second coil, where the first and second coils are stacked relative to each other and configured to be located at an aperture of a metal housing member; and a third layer located under the second layer, where the third layer comprises a ferrite member located under the second coil such that the second coil is between the first coil and the ferrite member, where the first coil or the second coil has a substantially "8" shape. The first coil may be a communication coil and the second coil may be a charging coil. The first coil may be a charging coil and the second coil may be a communication coil.

Figure 17:
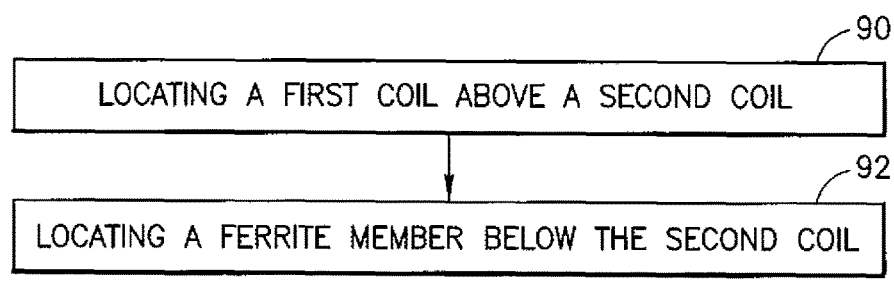
FIG. 17 is a diagram illustrating an example method.

Referring also to FIG. 17, an example method may comprise locating a first coil above a second coil as indicated by block 90; and locating a ferrite member below the second coil as indicated by block 92, where the coils and the ferrite member are assembled into a stack, where the first coil or the second coil has a substantially "8" shape. The first coil may be a communication coil and the second coil may be a charging coil. The first coil may be a charging coil and the second coil may be a communication coil. The method may further comprise locating a printed wiring board between the first and second coils, where the printed wiring board is a layer of the stack. The method may further comprise electrically connecting the first and second coils to the printed wiring board. The method may further comprise providing at least one aperture through each of the ferrite member and the printed wiring board adapted to allow light and/or sound pass through the stack.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

What is claimed is:

1. An apparatus comprising:
   a first layer having a first coil, where the first coil has a first shape comprising a substantially "8" shape;
   a second layer having a second coil, where the second coil has a second different shape different from the first shape, where the first and second coils are stacked relative to each other and configured to be located at an aperture of a housing member comprising electrically conductive material; and
   a third layer located under the second layer, where the third layer comprises a ferrite member located under the second coil such that the second coil is between the first coil and the ferrite member;
   where the ferrite member comprises at least one aperture therein, and where the first shape of the first coil and the second different shape of the second coil are each shaped to allow light and/or sound to pass through the first, second and third layers.

2. An apparatus as in claim 1 where the first coil is a communication coil and the second coil is a charging coil.

3. An apparatus as in claim 1 where the ferrite member is a sole ferrite member in the layers.

4. An apparatus as in claim 1 further comprising a fourth layer located between the first and second layers, where the fourth layer comprises a printed wiring board.

5. An apparatus as in claim 1 where the ferrite member comprises at least two apertures therein, and where the first and second coils are shaped to allow light and/or sound to pass through the first, second and third layers.

6. An apparatus as in claim 4 where the printed wiring board comprises at least one aperture therein to allow light to pass through the printed wiring board.

7. An apparatus as in claim 1 where the second coil comprises inward side notches, and where the first and second coils are shaped to allow light and/or sound to pass through the first, second and third layers.

8. An apparatus as in claim 1 wherein the first, second and third layers are sized and shaped to fit in the aperture in the housing member.

9. An apparatus as in claim 1 further comprising:
a housing comprising the housing member;
a camera;
a controller having the camera, the first coil and the second coil connected thereto, where the controller comprises a printed wiring board with a processor and at least one memory with software;
an electronic display connected to the controller;
a receiver connected to the controller;
a transmitter connected to the controller; and
a rechargeable battery connected to the controller.

10. An apparatus as in claim 1 where at least two of the layers are stationarily connected to one another as a module, where the module is configured to be connected to the housing member as a unitary assembly.

11. An apparatus as in claim 1 where the apparatus is a portable electronic device having the housing member.

12. An apparatus comprising:
a first layer having a first coil;
a second layer having a second coil, where the first and second coils are stacked relative to each other and configured to be located at an aperture of a housing member comprising electrically conductive material; and
a third layer located under the second layer, where the third layer comprises a ferrite member located under the second coil such that, the second coil is between the first coil and the ferrite member,
where the first coil or the second coil has a first shape comprising a substantially "8" shape, where the other of the first coil or the second coil has a second different shape different from the first shape;
where the ferrite member comprises at least one aperture therein, and where the first shape of the first coil and the second different shape of the second coil are each shaped to allow light and/or sound to pass through the first, second and third layers.

13. An apparatus as in claim 12 where the first coil is a communication coil and where the second coil is a charging coil.

14. An apparatus as in claim 12 where the first coil is a charging coil and where the second coil is a communication coil.

15. An electronic device comprising:
a housing member comprising electrically conductive material, wherein the housing member of the electronic device comprises an aperture;
a first layer having a first coil, where the first coil has a first shape comprising a substantially "8" shape;
a second layer having a second coil, where the second coil has a second different shape different from the first shape, where the first and second coils are stacked relative to each other and configured to be located at the aperture of the housing member of the electronic device; and
a third layer located under the second layer, where the third layer comprises a ferrite member located under the second coil such that the second coil is between the first coil and the ferrite member;
where the ferrite member comprises at least one aperture therein, and where the first shape of the first coil and the second different shape of the second coil are each shaped to allow light and/or sound to pass through the first, second and third layers.

* * * * *